Jan. 7, 1947.  E. M. MOREHOUSE  2,413,772
CLIP FOR MULTIPLE CONDUIT SUPPORTS
Filed Jan. 15, 1943  2 Sheets-Sheet 1
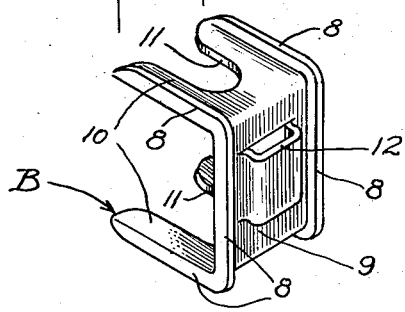
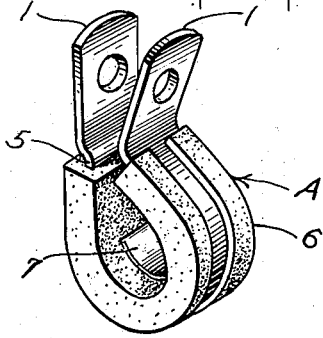
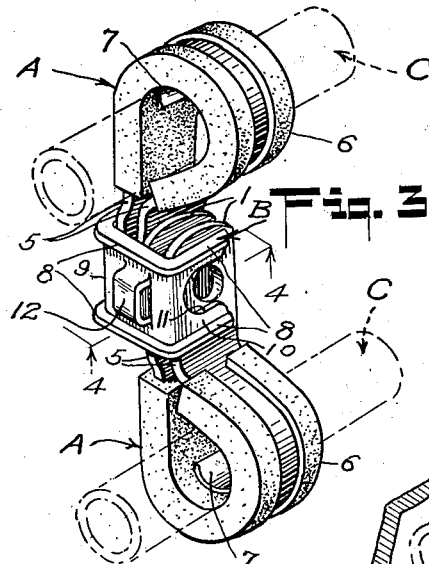
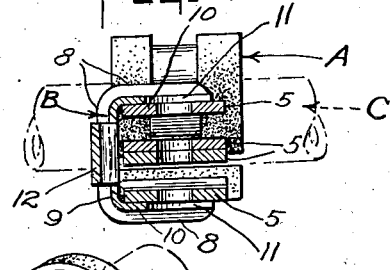
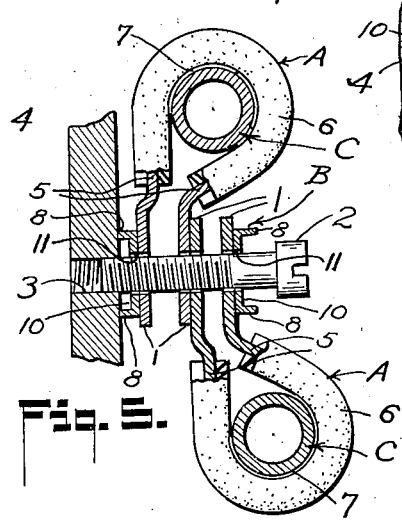
Inventor
EUGENE M. MOREHOUSE
By R. S. Berry
Attorney

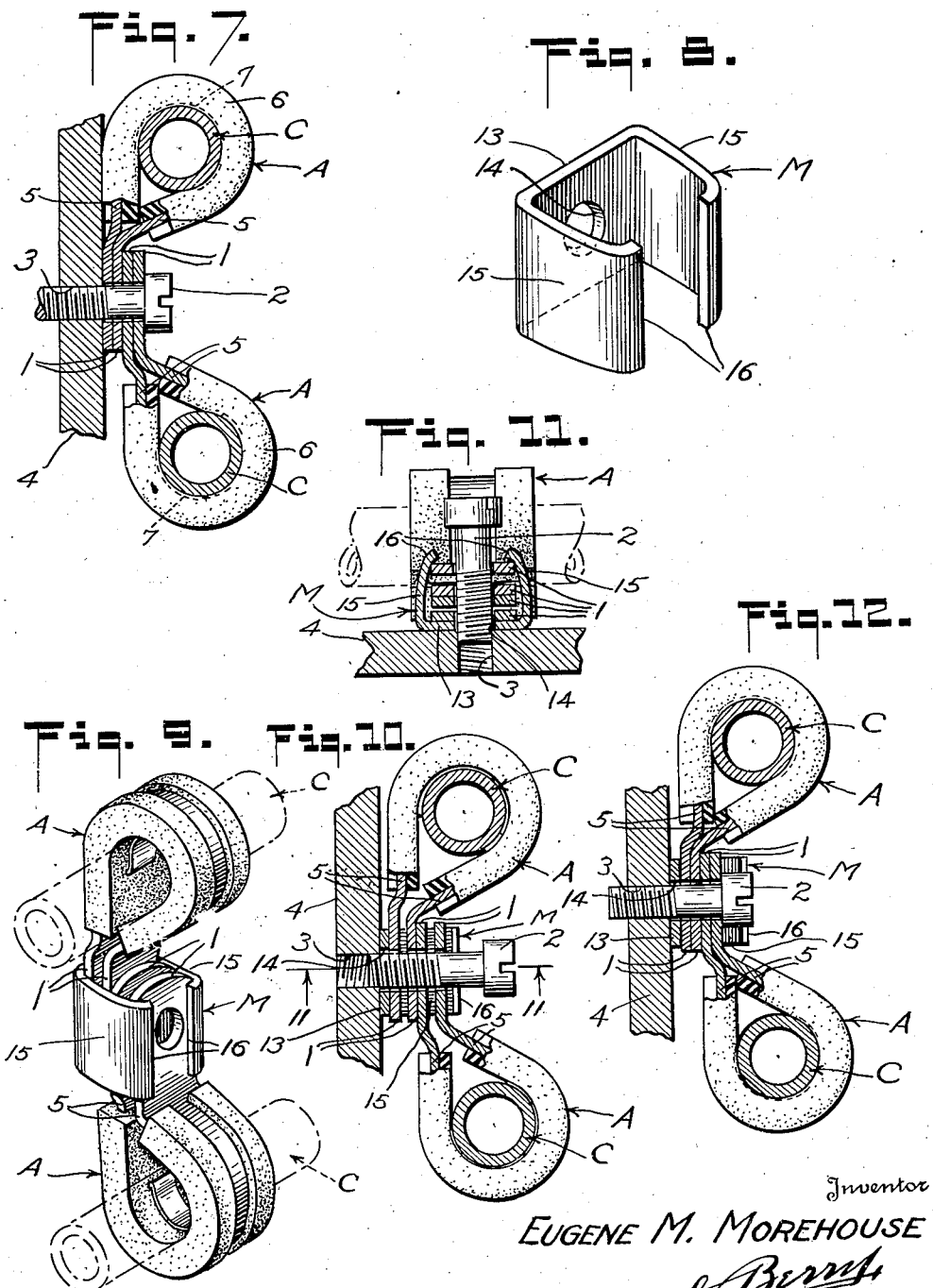

Patented Jan. 7, 1947

2,413,772

UNITED STATES PATENT OFFICE 2,413,772

CLIP FOR MULTIPLE CONDUIT SUPPORTS

Eugene M. Morehouse, Tujunga, Calif., assignor to Adel Precision Products Corp., a corporation of California Application January 15, 1943, Serial No. 472,528

2 Claims. (Cl. 24—243)

This invention relates in general to cushioned and electrically bonded clips as now commonly used to support conduit lines throughout aircraft, and more particularly pertains to a novel and efficient multiple clip arrangement wherein two such clips are installed with a single screw or bolt at an appreciable saving in time, space, material, labor and costs and with an advantageous reduction of the number of parts and the weight, per installed clip.

An object of this invention is to provide a multiple-clip conduit support of the character described wherein two clips, each supporting a conduit line, are simultaneously clamped on the conduits and fastened to a structural part of the aircraft with a single bolt or screw.

Another object of this invention is to provide a clasp or holder which is temporarily, or if desired, permanently applied to hold the two clips in the desired position on the two conduits, and in the desired connected and aligned relation to one another preliminary to the simultaneous clamping of said clips on the conduits and the simultaneous securing thereof to a structural part of the aircraft, thereby facilitating the installation of the two clips with a single bolt or screw as well as making possible an advantageous sub-assembly installation of clips and conduits as now generally practiced in airplane construction.

A further object of this invention is to provide a clasp or holder such as described which is subject to being readily and easily applied to the two clips and as readily removed following the insertion of the bolt or screw and the "starting" of the fastening action thereof, said clasp or holder being especially constructed to permit of the insertion of the bolt and having a means which is readily engageable by a screw driver or like prying tool to effect removal thereof from the assembly for repeated use.

Yet another object of this invention is to provide a clasp or holder such as described which in one form is constructed so that it may remain in the assembly and will serve as a washer.

With the foregoing objects in view, together with such other objects and advantages as may subsequently appear, the invention resides in the parts and in the combination, construction and arrangement of parts hereinafter described and claimed, and illustrated by way of example in the accompanying drawings, in which:

Fig. 1 is a perspective view of a clasp or holder embodying the present invention;

Fig. 2 is a perspective view of one of the conduit clips as used in the multiple clip assembly embodying the present invention;

Fig. 3 is a perspective view of a multiple clip assembly as held assembled with the clasp or holder hereof, preliminary to completing the installation thereof, the conduits being shown in dashed lines;

Fig. 4 is a sectional view taken on the line 4—4 of Fig. 3;

Fig. 5 is a part side elevational, part vertical sectional view of the assembly as it appears when the bolt is inserted and started so that the clasp may be removed;

Fig. 6 is a perspective view showing the partly installed assembly as in Fig. 5 and the manner in which the clasp may be removed in order to complete the installation;

Fig. 7 is a part sectional, part elevational view corresponding to Fig. 5 but showing the assembly hereof completely installed and the clasp removed;

Fig. 8 is a perspective view of a modified form of clasp;

Fig. 9 is a perspective view of a multiple clip sub-assembly as held assembled with the clasp shown in Fig. 8;

Fig. 10 is a part sectional, part side elevational view taken of the sub-assembly of Fig. 9 as when partly installed;

Fig. 11 is a sectional view taken on the line 11—11 of Fig. 10;

Fig. 12 is a view similar to Fig. 10, with the assembly completely installed.

Referring to the drawings more specifically, particularly Figs. 1 to 7 thereof, it is seen that one embodiment of my invention includes a multiple clip assembly consisting of a pair of conduit clips A mounted in opposed relation to one another and having their apertured ends 1 overlapped and connected by a single screw 2 which passes through the apertures in said ends and is screwed into threaded opening 3 in a metal structural part 4 of an aircraft. On tightening the screw 2 the clips are tightly clamped on the conduits C and at the same time securely fastened to the structural part 4 as shown in Fig. 7 thereby advantageously installing and mounting the two clips with a single screw.

Each of the clips A as here shown comprises a metal strap 5 provided with the apertured opposed ends 1, a cushion 6 of compressible and insulation material supported by the strap, and a metallic bonding strip 7 having a portion disposed on the cushion to engage the conduit and a portion disposed in contact with the strap between the latter and the cushion.

A sub-assembly of conduits C and clips A in accordance with this invention consists of the two clips A embracing the conduits C with the apertured ends 1 grouped together in overlapped relation as shown in Figs. 3 and 4 to align the apertures in said ends for reception of the screw 2. In order to hold these ends together with their apertures aligned and also maintain the clips at the desired positions on the conduits, I employ a holding means which as shown in Figs. 3 and 4, is in the form of a rigid and somewhat resilient clasp B subject to removal after the screw is started as shown in Fig. 5.

The clasp B as here shown is U-shaped and provided with the reinforcing flanges 8 on the longitudinal edges of the mid-portion 9 and the opposed leg portions 10 thereof. The leg portions 10 are provided with end opening slots 11 to accommodate the screw 2 while said legs lie against and embrace the outer faces of the ends 1 as shown in Figs. 3 and 4. These slots 11 make it possible to remove the clasp after the screw 2 is started. The legs 10 are spaced apart a distance to accommodate therebetween the four apertured ends 1 with the ends of each clip spaced from one another while one end of one clip engages one end of the other clip as shown in Fig. 4.

The straps 5 of these clips are resilient and the ends of the clips are normally spaced apart as shown in Fig. 2, but in order to apply the clasp B sidewise as shown in Figs. 3 and 4, said ends are overlapped and brought closer together in such manner that the clips will be clamped on the conduits and remain in the desired position for sub-assembly purposes. The ends 2 which are next to the legs 10 of the clasp will have a tensioned contact with said legs due to the tendency of the ends to spring apart and the resiliency of the clasp thereby securely holding the clasp in place with the slots 11 aligned with the apertures in said ends as shown in Figs. 3 and 4.

It is now apparent that after the two clips A are snapped or otherwise placed on the conduits C the ends 1 thereof may be readily overlapped and "squeezed" together with one hand or a pair of pliers to form a compact group which will permit of an easy application of the clasp B with the other hand to hold the two clips assembled as shown in Figs. 3 and 4, ready for the insertion of the screw 2. It will be seen that after said clasp is applied its mid-length portion is in an abutting relation to the edges of the clip ends embraced by the clasp.

When the screw 2 has been started as shown in Figs. 5 and 6, the operator may readily remove the clasp B by inserting a screw driver or similar tool T as shown in Fig. 6, into an outwardly directed part thereof shown as a small loop 12 struck out from the mid-portion 9 of the clasp and then prying the clasp from the clip assembly, following which the screw is tightened to complete the installation as shown in Fig. 7.

A modified form of this invention as shown in Figs. 8 to 12 inclusive takes into consideration the use of a U-shaped clasp M in which the mid-portion 13 lies against the structure 4 and has a bolt hole 14 therein. The two legs 15 have inturned ends or flanges 16 adapted to overlie the outer face of the outermost apertured end 1 of the outer clip A as shown in Figs. 9 and 11.

In Figs. 8 to 12 the clips, screw and structural part of the aircraft are identical with those shown in Figs. 1 to 7 and are identified by the same reference characters.

The application of the modified form of clip M requires that the ends 1 of one of the clips be inserted therein and then the end 1 of the other clip inserted, certain of said ends springing apart to have tensioned engagement with the mid-portion 13 and flanges 16 respectively as shown in Figs. 9 and 11, thereby holding the clasp in place and the two clips assembled as a unit ready for application of the screw 2. The clasp M remains in the assembly and serves as a washer when the installation is completed as shown in Fig. 12, the purpose of this clasp being otherwise the same as that of the removable clasp shown in Figs. 1 to 7 inclusive.

While I have shown and described specific embodiments of my invention I do not limit myself to the exact details of construction set forth, and the invention embraces such changes, modifications and equivalents of the parts and their formation and arrangement as come within the purview of the appended claims.

I claim:

1. In a clasp for holding in overlapping relation the apertured ends of a plurality of conduit supporting clips which latter have been mounted to embrace conduits, a mid-portion adapted to lie against certain corresponding longitudinal edges of said ends, leg portions extending from said mid-portion for receiving and holding said apertured ends therebetween with the outer faces of the outermost ends of the group thereof in contact with the inner faces of said leg portions, said leg portions having slots therein for reception of a fastening which is inserted through the apertures in said ends to clamp the clips in place and secure them to a support, said slots opening at margins of said legs to permit of removal of said clasp after the fastening is inserted, and a loop struck out from said mid-portion for reception of a tool to effect removal of the clasp.

2. In a clasp for holding in overlapping relation the apertured ends of a plurality of conduit supporting clips which latter have been mounted to embrace conduits, a mid-portion adapted to lie against certain corresponding longitudinal edges of said ends, leg portions extending from said mid-portion for receiving and holding said apertured ends therebetween with the outer faces of the outermost ends of the group thereof in contact with the inner faces of said leg portions, said leg portions having slots therein for reception of a fastening which is inserted through the apertures in said ends to clamp the clips in place and secure them to a support, said slots opening at outer end margins of said legs to permit of removal of said clasp after the fastening is inserted, and a loop struck out from said mid-portion for reception of a tool to effect removal of the clasp.

EUGENE M. MOREHOUSE.